US012210546B2

(12) United States Patent
Patel et al.

(10) Patent No.: US 12,210,546 B2
(45) Date of Patent: Jan. 28, 2025

(54) SYSTEM AND METHOD FOR MANAGING STORAGE USAGE AND CAPACITY

(71) Applicant: Dell Products L.P., Round Rock, TX (US)

(72) Inventors: Dharmesh M. Patel, Round Rock, TX (US); Prem Pradeep Motgi, Austin, TX (US); Manpreet Singh Sokhi, Santa Clara, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/308,366

(22) Filed: Apr. 27, 2023

(65) Prior Publication Data

US 2024/0362254 A1 Oct. 31, 2024

(51) Int. Cl.
*G06F 16/30* (2019.01)
*G06F 16/215* (2019.01)
*G06F 16/23* (2019.01)
*G06F 16/28* (2019.01)

(52) U.S. Cl.
CPC .......... *G06F 16/285* (2019.01); *G06F 16/215* (2019.01); *G06F 16/2365* (2019.01)

(58) Field of Classification Search
CPC ... G06F 16/285; G06F 16/215; G06F 16/2365
See application file for complete search history.

(56) References Cited

U.S. PATENT DOCUMENTS

| 8,117,235 | B1* | 2/2012 | Barta ............... G06F 3/0607 707/827 |
| 8,255,948 | B1 | 8/2012 | Black et al. |
| 8,495,720 | B2 | 7/2013 | Counterman |
| 9,361,428 | B2 | 6/2016 | Bessette |
| 9,781,097 | B2 | 10/2017 | Grajek et al. |
| 10,042,993 | B2 | 8/2018 | Beigi |
| 10,073,948 | B2 | 9/2018 | Cohen et al. |
| 10,157,275 | B1 | 12/2018 | Venkatasamy et al. |

(Continued)

FOREIGN PATENT DOCUMENTS

| CN | 202058147 U | 11/2011 |
| CN | 115292285 A | 11/2022 |
| WO | 2023/220948 A1 | 11/2023 |

OTHER PUBLICATIONS

Page, Sébastien, "How to move your Health data from one iPhone to another," iDB, Web Page <https://www.downloadblog.com/2016/10/13/health-data-importer-makes-moving-your-health-data-from-one-iphone-to-another-a-breeze/> accessed on Oct. 30, 2022 (9 Pages).

(Continued)

*Primary Examiner* — Khanh B Pham
(74) *Attorney, Agent, or Firm* — Womble Bond Dickinson (US) LLP

(57) ABSTRACT

Methods and systems for managing access and control of data are disclosed. To manage access and control, a data management system may use a variety of data minimization and resiliency techniques to differentiate different repositories for storage of data. The different repositories may store data in different manners, and provide different levels of performance regarding stored data. By differentiating the repositories, criteria may be established and enforced to prioritize different types of data for storage.

20 Claims, 9 Drawing Sheets

(56) References Cited

U.S. PATENT DOCUMENTS

| | | | |
|---|---|---|---|
| 10,462,142 | B2 | 10/2019 | Pattar et al. |
| 10,701,056 | B2 | 6/2020 | Murthy |
| 10,904,237 | B2 | 1/2021 | Murthy et al. |
| 11,010,392 | B1 | 5/2021 | Hirsch et al. |
| 11,094,402 | B2 | 8/2021 | Brown et al. |
| 11,217,331 | B2 | 1/2022 | Vishnubhatla et al. |
| 11,405,189 | B1 | 8/2022 | Bennison |
| 11,763,821 | B1 | 9/2023 | McNair |
| 11,849,069 | B1 | 12/2023 | Can |
| 2008/0154961 | A1 | 6/2008 | Dougall |
| 2009/0171692 | A1 | 7/2009 | Zilberman et al. |
| 2010/0169304 | A1 | 7/2010 | Hendricksen et al. |
| 2011/0131174 | A1* | 6/2011 | Birch .................. G06F 16/22 707/E17.014 |
| 2012/0265771 | A1 | 10/2012 | Suh |
| 2014/0181673 | A1 | 6/2014 | Work |
| 2014/0201199 | A1 | 7/2014 | Hajaj |
| 2014/0207885 | A1 | 7/2014 | Baker et al. |
| 2014/0344288 | A1 | 11/2014 | Evans |
| 2015/0169574 | A1 | 6/2015 | Bau et al. |
| 2015/0199268 | A1* | 7/2015 | Davis .................. G06F 12/0246 711/103 |
| 2015/0356127 | A1 | 12/2015 | Pierre et al. |
| 2016/0006839 | A1 | 1/2016 | Sawazaki |
| 2016/0231928 | A1 | 8/2016 | Lewis et al. |
| 2016/0232159 | A1 | 8/2016 | Parikh |
| 2016/0306812 | A1 | 10/2016 | McHenry et al. |
| 2017/0365101 | A1 | 12/2017 | Samec et al. |
| 2018/0121502 | A1 | 5/2018 | Prieur |
| 2018/0189352 | A1 | 7/2018 | Ghafourifar |
| 2018/0203612 | A1 | 7/2018 | Kats et al. |
| 2019/0279744 | A1 | 9/2019 | Towley et al. |
| 2020/0226216 | A1 | 7/2020 | Marin et al. |
| 2021/0056131 | A1 | 2/2021 | Ackermann et al. |
| 2021/0065203 | A1 | 3/2021 | Billigmeier et al. |
| 2021/0390196 | A1* | 12/2021 | Lavine .................. H04L 63/102 |
| 2022/0261152 | A1* | 8/2022 | Jude .................. G06F 3/0647 |
| 2022/0293087 | A1 | 9/2022 | Kumar |
| 2022/0334719 | A1* | 10/2022 | Thrane .................. G06F 3/0608 |
| 2023/0068099 | A1 | 3/2023 | Abramenko et al. |

OTHER PUBLICATIONS

"MyChart," Web Page <https://www.mychart.org/> accessed on Oct. 30, 2022 (6 Pages).

Xu, Jie, et al., "Federated learning for healthcare informatics," Journal of Healthcare Informatics Research 5 (2021): 1-19. (19 Pages).

Naz, Sadaf, et al., "A comprehensive review of federated learning for COVID-19 detection," International Journal of Intelligent Systems 37.3 (2022): 2371-2392. (22 Pages).

Prasser, Fabian, et al., "Efficient and effective pruning strategies for health data de-identification," BMC medical Informatics and decision making 16.1 (2016): 1-14. (14 Pages).

Balaskas, Georgios, et al., "An end-to-end system for transcription, translation, and summarization to support the co-creation process. A Health CASCADE Study", ACM PETRA '23, published Aug. 10, 2023, pp. 625-631. (Year: 2023) (7 Pages).

"FollowMyHealth®," Allscripts Healthcare Solutions Inc, Google Play Store, Web Page <https://play.google.com/store/apps/details?id=com.jardogs.fmhmobile&hl=en_US&gl=US> accesed on Jan. 8, 2023 (4 Pages).

* cited by examiner

SYSTEM AND METHOD FOR MANAGING STORAGE USAGE AND CAPACITY

FIELD

Embodiments disclosed herein relate generally to storage management. More particularly, embodiments disclosed herein relate to systems and methods to manage storage use in a data management system.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
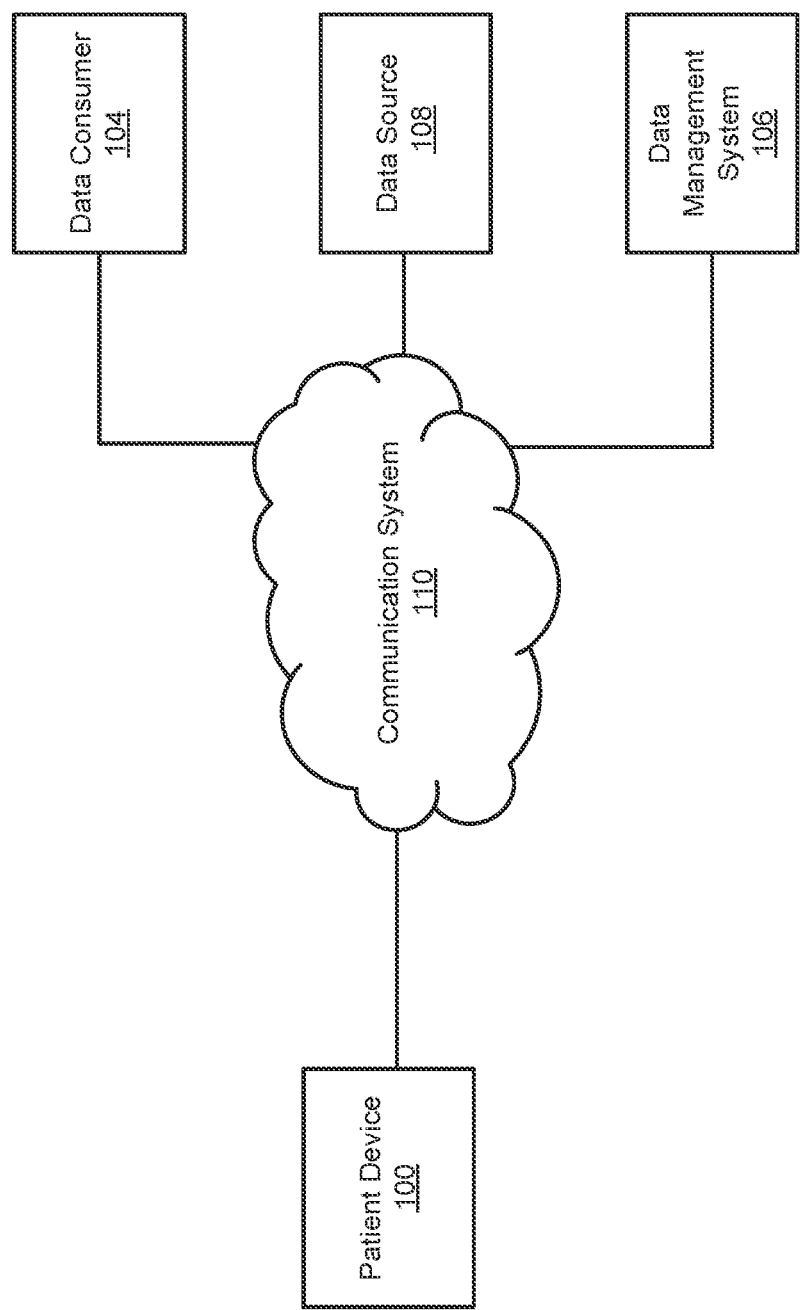
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing access and control of data. The data may be usable, for example, by (i) an individual for which the data is regarding, and (ii) other individuals to assist the individual. For example, the data may include medical information for an individual and the data may be usable by other individuals such as healthcare providers to diagnose and/or treat the individual for various medical conditions.

The system may include a data management system. The data may be stored in the data management system and accessed by an individual or other individuals (via associated devices) that are allowed access as permitted by the individual for which the data is stored.

The data management system may include a finite number of storage resources thereby limiting the amount of data that may be stored, as well as the relative level of performance in accessing the stored data. To improve the amount of data that may be stored as well as performance, a variety of data minimization techniques and storage criteria may be used to selectively store data in the limited available storage resources.

Additionally, to further enhance storage, various enhancements to the storage resources may be facilitate through advertisement of and providing access to some of the data management by the data management system to third parties (e.g., data consumers). These consumers and the person primarily interested in the content of the data management system may establish a variety of different criteria usable to manage storage of data in storage resources of the data management system and supplemental storage resources contributed by other systems (e.g., cloud storage).

By doing so, embodiments disclosed herein may more efficiently marshal limited resources for storage of data by implementing a framework through which different types of data may be prioritized for different types of storage based on input from multiple parties that may have separate interests in the data.

In an embodiment, a method for managing storage space use in a data management system is provided. The method may include obtaining a data package from a data source, the data package comprising data relevant to a person for which the data management system provides data storage services; obtaining a portion of data from the data package, the portion of data not being classified for storage in tier classified repositories managed by the data management system; performing a tier classification process using the portion of the data and at least one classification criteria to select a tier classified repository of the tier classified repositories, the at least one classification criteria being defined by the person; and storing the portion of the data in the tier classified repository.

Each of the tier classified repositories may perform respective workflows for storing data in the respective tier classified repository, each of the different respective workflows may include a subset of a set of data minimization techniques, the data minimization techniques placing stored data in a reduced size state and requiring different quantities of computing resources to reconstitute the stored data using the reduced size state data.

The Data minimization techniques may include deduplication and compression.

Each of the tier classified repositories may include an amount of limited storage resources allocated to the respective tier classified repository, the amount being based on a storage performance level for the respective tier classified repository, the storage performance level being indicated to the person as a level of performance that the respective tier classified repository will exhibit for storage of the person's data.

The method may also include for a tier classified repository of the tier classified repositories: establishing storage performance for the tier classified repository, the establishing the storage performance including during a registration of the person for the data management system: obtaining, from the person, a selection indicating minimum acceptable level of performance for the tier classified repository.

Establishing the storage performance may also include after the registration of the person for the data management system: obtaining, from the person, a second selection indicating an agreed to enhancement for the minimum acceptable level of performance for the tier classified repository, the agreed to enhancement also granting access to at least a portion of the person's data stored in the data management system to a data consumer that is a party to the agreed to enhancement.

Establishing the storage performance may also include obtaining an enhanced minimum acceptable level of performance using the selection and the second selection to obtain the storage performance.

Performing the tier classification process may include discriminating a first classification criteria from first multiple classification criteria based on the portion of the data; discriminating a second classification criteria from second multiple classification criteria based on the portion of the data; resolving a difference between the first classification criteria and the second classification criteria to obtain a resolved classification criteria; and identifying one of the tier classified repositories for the portion of the data based on the resolved classification criteria.

The first multiple classification criteria and the second multiple classification criteria may include different types of classification criteria, the types of classification criteria being established by the person during a registration process.

The method may also include performing a data reduction process using at least the portion of data from at least one of the tier classified repositories to obtain advertised data, the advertised data being accessible by a data consumer; obtaining a request for access to the portion of data based on the advertised data, the request being received from the data consumer; requesting authorization to disclose the portion of data associated with the advertised data, the request being made to a patient device; obtaining a response indicating whether authorization is granted by the patient device; in a first instance of the response where the authorization to disclose the portion of data is granted by the patient device: providing the portion of data to service the request.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer-implemented services may include data management services, data storage services, data access and control services, database services, and/or any other type of service that may be implemented with a computing device.

To provide the computer implemented services, data may be stored in data management system 106. The data stored in data management system 106 may include data usable (i) by an individual for which the data is stored, (ii) by other individuals to assist the individual, and (iii) by other individuals for other types of use.

For example, an individual's healthcare information may be stored in data management system 106. In some instances, certain portions of the healthcare information may be more useful than other portions of the healthcare information, for example, healthcare information related to a chronic health issue such as diabetes. As such, the healthcare information related may need to be accessed and used more frequently by the individual and/or other individuals to assist the individual.

The data stored in data management system 106 may be collected from data source 108. For example, an individual's healthcare information may be obtained from a healthcare provider system for use by the individual and/or other individuals. The data collected from data source 108 may include any quantity, size, and type of data. The data may include, for example, large quantities of data relating to healthcare information for an individual.

Storing data in data management system 106 may consume limited storage resources available to data management system 106. For example, data management system 106 may have a finite amount of storage resources for storing data.

Additionally, hardware devices (e.g., hard disk drives, solid state drives, tape drives, etc.) of data management system 106 may limit the rate at which data may be stored and accessed. Consequently, only some of the data stored in data management system 106 may be accessed more quickly, while other portions may require more time to access the data.

In general, embodiments disclosed herein may provide methods, systems, and/or devices for managing storage of data in data management systems. The storage may be managed in a manner that balances storage space and performance against the limited amount resources of data management systems.

To manage storage of data in data management systems, a storage framework may be implemented that facilitates (i) fair division of the limited resources for storing data for a variety of different persons, and (ii) potential expansion of use of the limited resources of the data management system through automated distribution of data from data management systems.

To provide the above noted functionality, the system of FIG. 1 may include patient device 100, data consumer 104, data management system 106, data source 108, and communication system 110. Each of these components is discussed below.

Figure 2A:
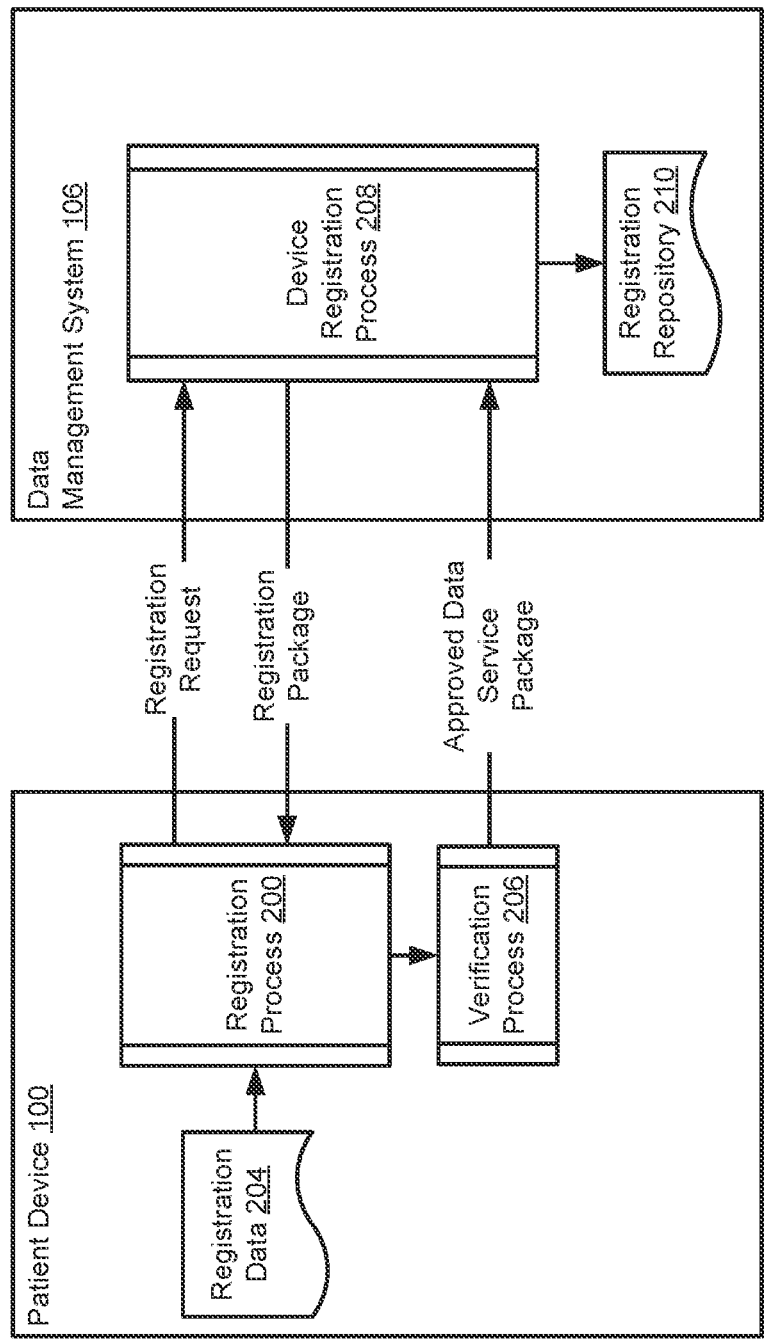
FIGS. 2A-2C show diagrams illustrating data flows in accordance with an embodiment.
Figure 2B:
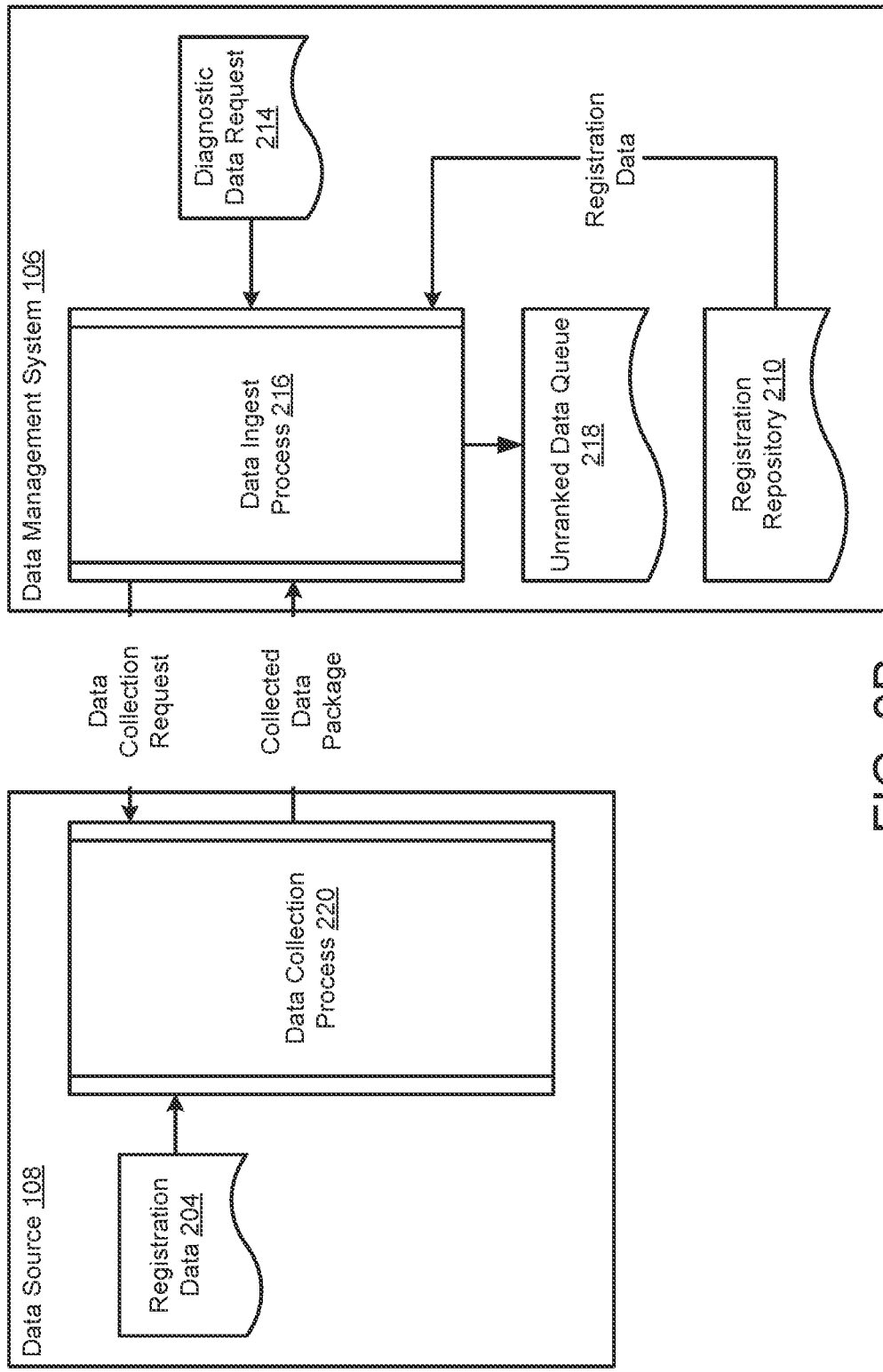
Figure 2C:
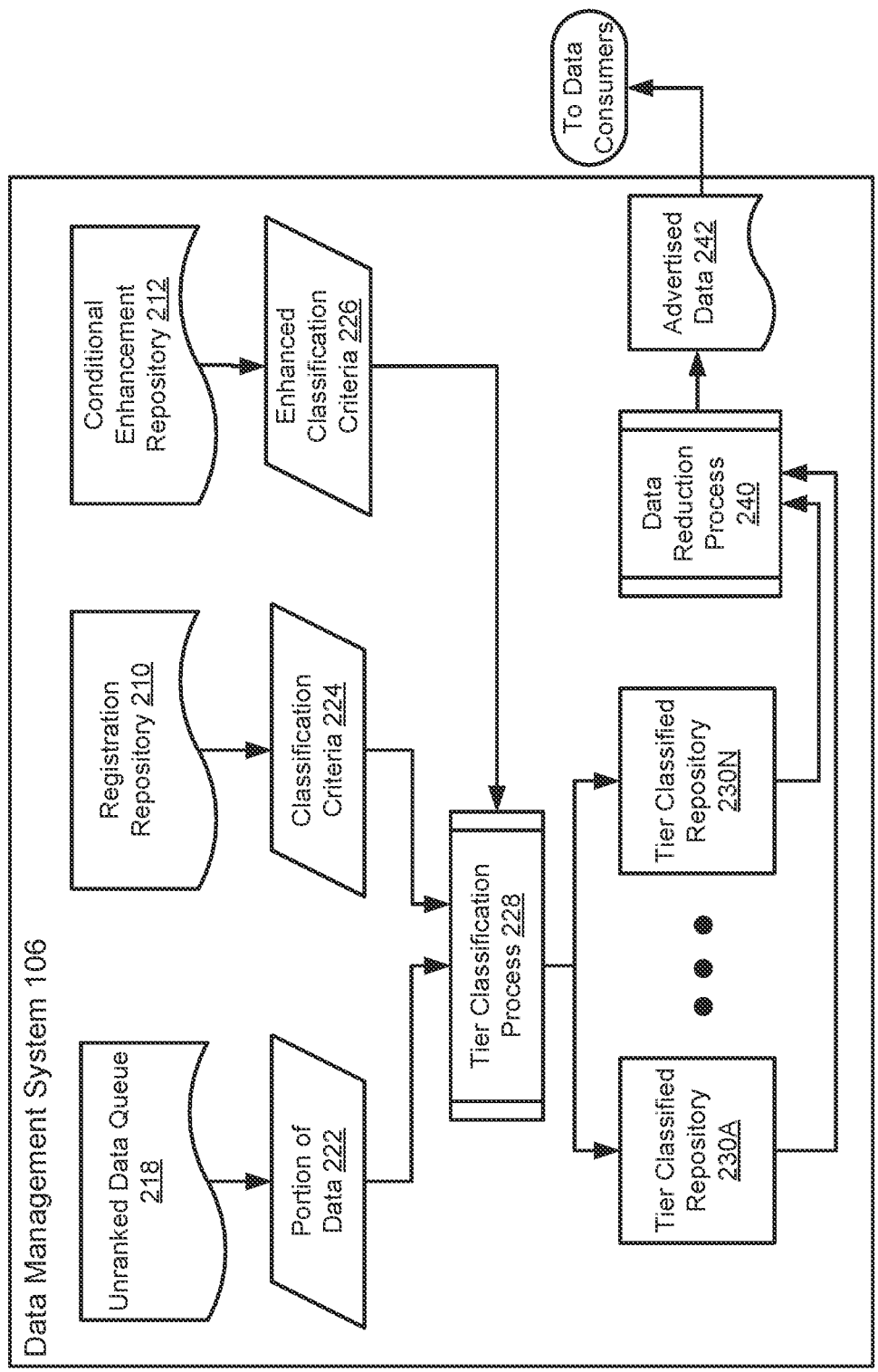
Figure 2D:
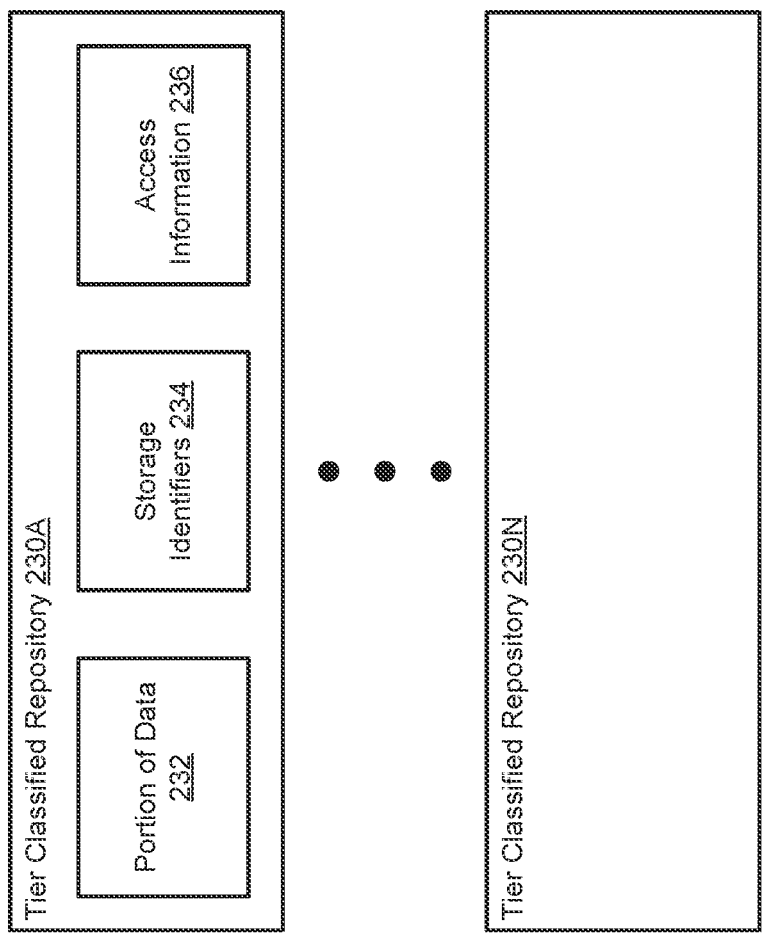
FIG. 2D shows a diagram illustrating a data structure in accordance with an embodiment.
Figure 2E:
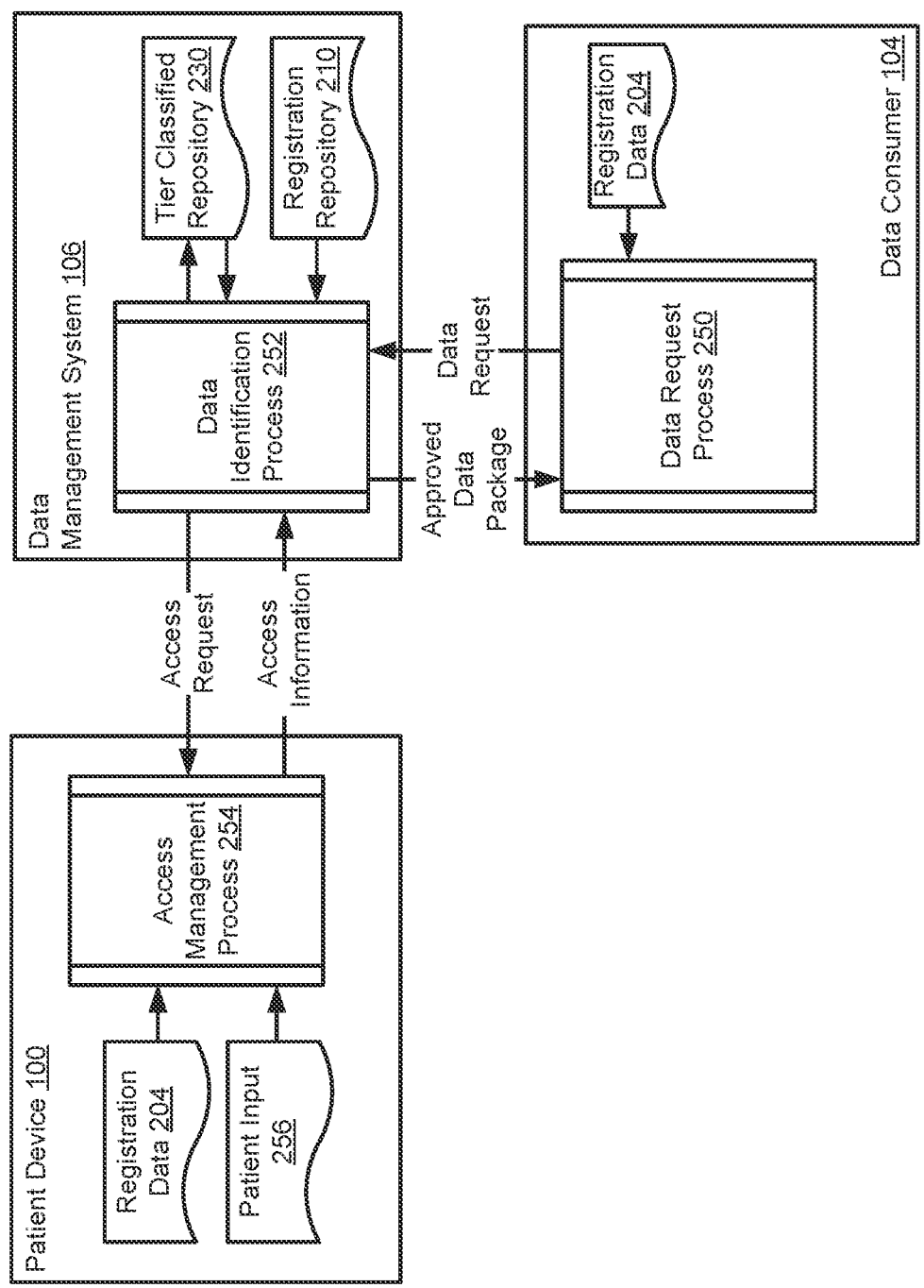
FIG. 2E shows a diagram illustrating a data flow in accordance with an embodiment.

Patient device 100 may facilitate (i) control over data stored in data management system 106 by an individual, (ii) control over the storage capacity and capabilities of systems in which the data is stored (e.g., in data management system 106), (iii) designation of portions of data for use by other individuals (e.g., data consumer 104), and/or (iv) performance of other management operations. Patient device 100 may be registered with data management system 106. Refer to FIG. 2A for additional details regarding registration of patient device 100. Refer to FIG. 2E for additional details regarding managing control over access to data stored in data management system 106.

Patient device 100 may be implemented using, for example, a personal electronic device (e.g., a cell phone, a tablet computer, etc.), a desktop computer, and/or other types of devices that may be operated or used by a patient or individual for which the data is stored in data management system 106.

Data source 108 may (i) facilitate collection and transmission of data regarding an individual or patient to data management system 106, (ii) provide information identifying the individual or entity sourcing the data to data management system 106, and/or (iii) perform other collection and transmission operations. Data source may be registered with data management system 106. Data source 108 may be, for example, a system operated by a medical provider which may provide access to data regarding a person to data management system 106, a person device that collects information about a person when worn, or another type of data collection device. Refer to FIG. 2A for additional details regarding registration of data source 108. Refer to FIG. 2B for additional details regarding obtaining data using data source 108.

Data source 108 may be managed by (i) a patient or an individual for which the data (e.g., healthcare information) is regarding, (ii) medical professionals, and/or (iii) other professional individual that may provide healthcare services. For example, data source 108 may be implemented using a professional medical device and/or other device operated by medical provider. As an additional example, data source 108 may be implemented using a personal electronic device (e.g., a cell phone, a tablet computer, etc.), a personal sensing system (e.g., personal monitoring device such as a smart watch), or other type of device that may be owned or managed by a patient and through which data may be acquired (e.g., using sensors). Although data source 108 is represented as a single component of the system, data source 108 may include one or more data sources through which healthcare information and/or other types of regarding and/or relevant to a person may be obtained.

Data source 108 may collect and provide similar or different data at different levels of quality (e.g. high resolution files). Thus, in some instances similar healthcare information may be collected from various data sources.

Data consumer 104 may (i) obtain limited access to selective portions of data stored in data management system 106, (ii) submit request for access to data stored in data management system 106 by a third party or other individual, (iii) provide information identifying the individual or entity requesting access to the data and/or other types of information upon which decisions to grant access may be based, and/or (iv) once a request for access is granted (e.g., by patient device 100), obtain access to data stored in data management system 106 (e.g., data for which access has been granted based on the submitted requests). Data consumer 104 may submit requests for access to data (based on the selective portions of data) stored in data management system 106.

Data consumer 104 may also facilitate supplementation of resources of data management system 106. For example, in exchange for limited access, data consumer 104 may provide access to additional storage resources which data management system 106 may use to store data for a person. The additional storage resources may be provided by, for example, public or private cloud computing systems (not shown), network storage systems, and/or other types of devices which may operably connect to and be utilized by data management system 106. Refer to FIG. 2C for additional details regarding preparation for providing selective portions of data for data consumer 104. Refer to FIG. 2E for additional details regarding requesting access to data stored in data management system 106.

Data consumer 104 may be implemented by using, a personal electronic device, a desktop computer, and/or other types of devices that may be operated or used by a data consumer (e.g., an individual or third-party seeking access to the data).

To manage collection and storage of data, data management system 106 may (i) register patient device 100, data source 108, data consumer 104, and/or any other additional devices, (ii) obtain classification criteria for data to manage storage of data from patient device 100, (iii) establish storage performance for storage of data regarding the patient, (iv) obtain data from data source 108, (v) perform a tier classification process to identify storage location for data, and/or (vi) store data based on the result of the tier classification process. Similarly, data management system 106 may also provide access to stored information (e.g., to the person and/or data consumers). Refer to FIGS. 2B-2E for additional details regarding storing data and providing access to data.

Data management system 106 may be implemented with multiple computing devices. For example, data management system 106 may be implemented with a data center, cloud installation, or other type of computing environment. The computing environment may host a software stack for registering devices, and system for obtaining and managing privately held information.

Figure 3A:
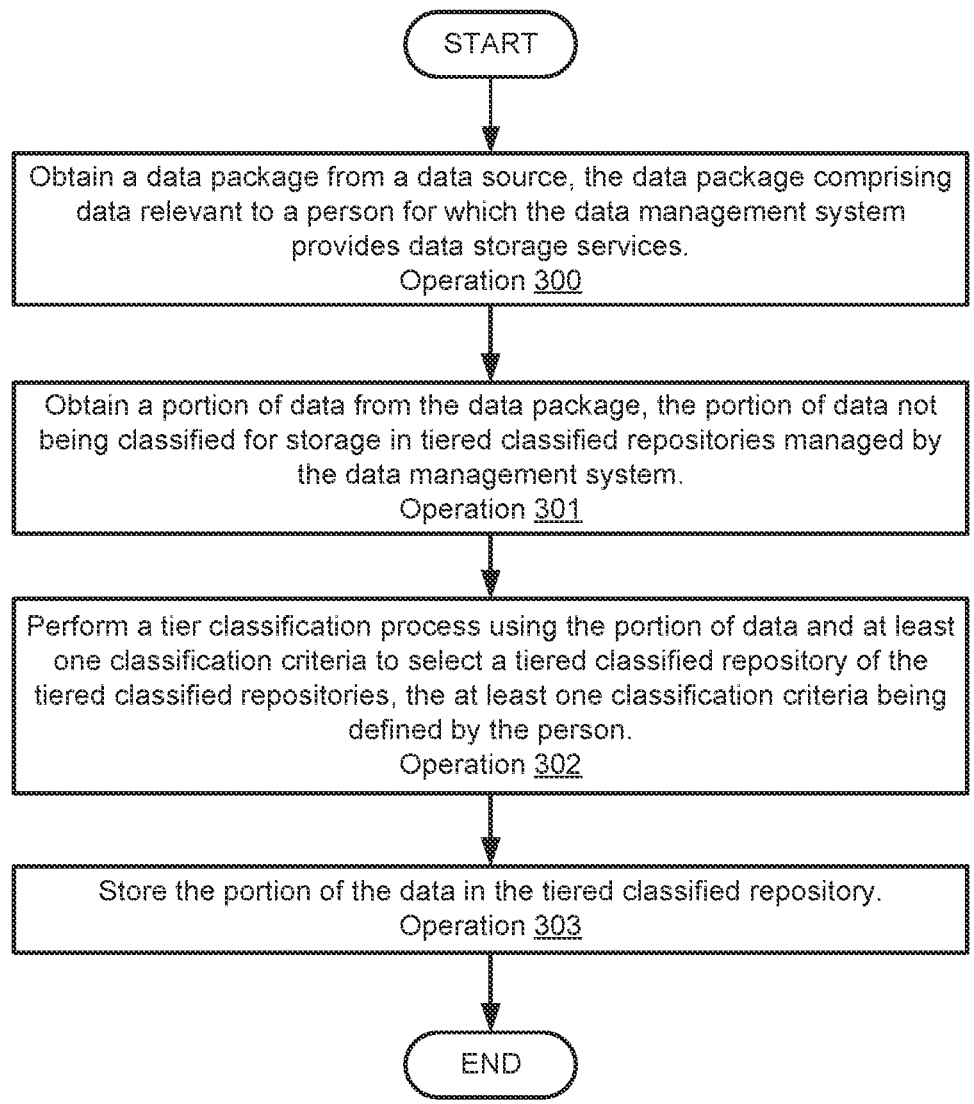
FIGS. 3A-3B show flow diagrams illustrating methods of managing storage usage in accordance with an embodiment.
Figure 3B:
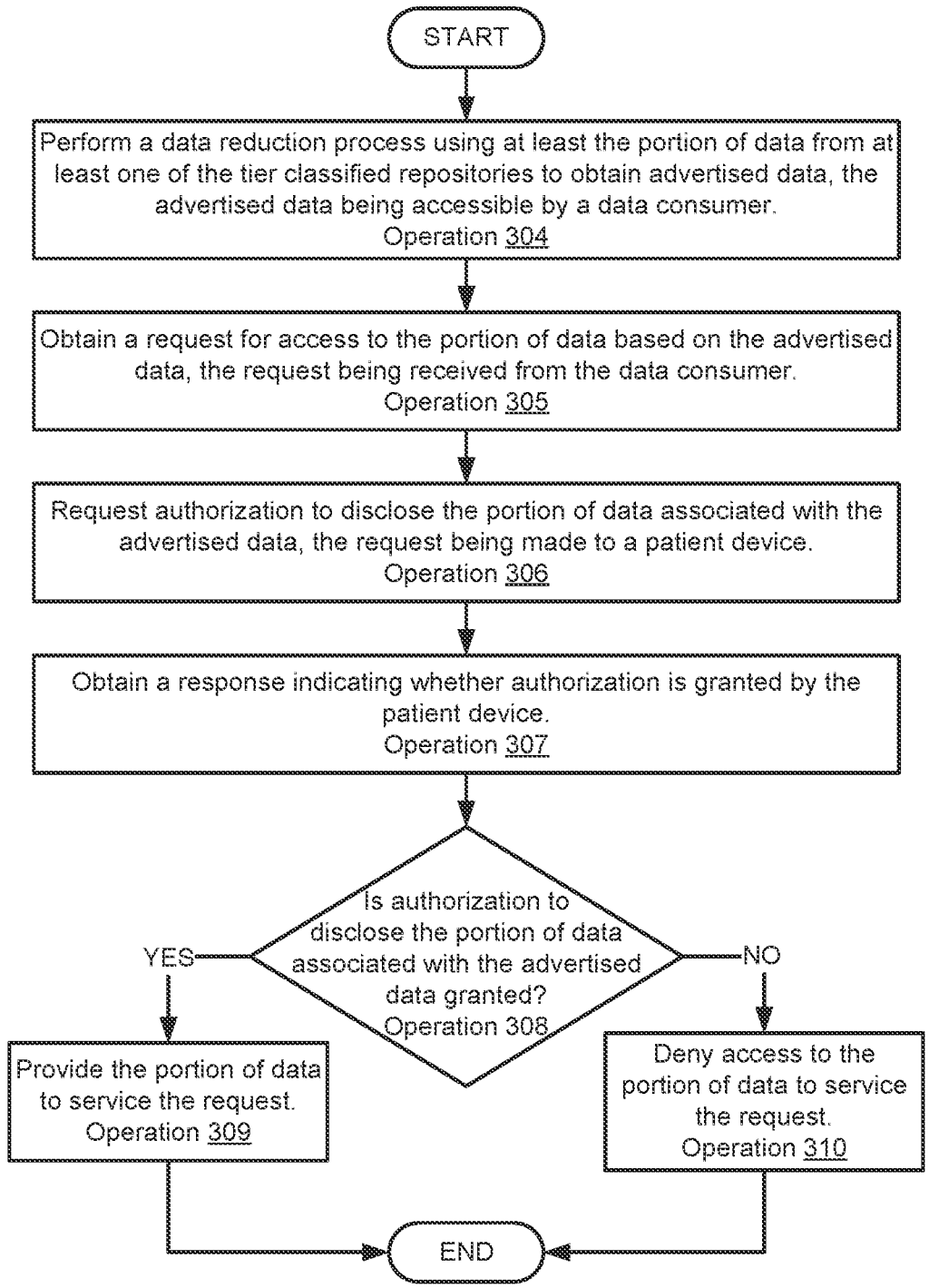

When providing their functionality, any of patient device 100, data consumer 104, data management system 106, and/or data source 108 may perform all, or a portion, of the methods shown in FIGS. 3A-3B.

Any of the components illustrated in FIG. 1 may be operably connected to each other (and/or components not illustrated) with communication system 110. In an embodiment, communication system 110 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

Additionally, while illustrated in FIG. 1 with respect to data source 108, it will be appreciated that the system may include any number of additional data sources 108 which may each collect and transmit similar and/or different data to data management system 106. For example, an individual's healthcare information may be collected by multiple medical providers with their associated devices and provided to data management system 106.

To further clarify embodiments disclosed herein, diagrams illustrating data flows implemented by a system over time in accordance with an embodiment are shown in FIGS. 2A-2C, and 2E. Additionally, a data structure diagram in accordance with an embodiment is shown in FIG. 2D.

Turning to FIG. 2A, a first data flow diagram illustrating data flows, data processing, and/or other operations that may be performed by the system of FIG. 1 in accordance with an embodiment is shown. In FIG. 2A, example flows between patient device 100 and data management system 106 are shown. It will be appreciated that similar flow with respect to any additional devices (e.g., data consumer 104, data source 108, and/or other devices) and data management system 106 may be present.

To manage storage space use of data, data management system 106 may require that patient device 100 associated with the individual for which data is stored, data consumer 104, and data source 108 be registered with data management system 106 prior to allowing data to be obtained, analyzed, and stored in data management system 106. To register with data management system 106, patient device 100 may perform registration process 200. During registration process 200, patient device 100 may send a registration request to device registration process 208 performed by data management system 106.

The registration request may include information regarding patient device 100. For example, the registration request may include identifying information such as a device identifier, device IP address, and/or other types of information regarding patient device 100. Additionally, the registration request may include information regarding the individual associated with the device. For example, patient device 100 may provide information regarding the patient (e.g., personal identification such as patient's name, date of birth, gender, and/or any other personal information identifying the patient).

Once obtained, device registration process 208 may use the information to (i) establish a registration for patient device 100 in registration repository 210, (ii) generate an identifier or metadata through which patient device 100 may be identified, and/or (iii) provide registration package to patient device 100 which may include the identifier or metadata generated by data management system 106 for patient device 100. The registration package may include a request for designation of classification criteria, storage level performance, and/or election for potential storage enhancement for the data (all or a portion) stored in data management system 106. Based on the request, data management system 106 may grant the registration and/or may respond with requests for verification of individual operating patient device 100.

When registration package is obtained by registration process 200, the identifier or metadata (e.g., generated by data management system 106) may be stored as registration data 204 by patient device 100 for future use.

In addition, when obtained by the registration process 200, the request for designation of classification criteria, storage level performance, and/or election for potential storage enhancement for the data (all or a portion) stored in data management system 106 may be initiated by patient device 100. The request for designation of classification criteria may request that a person identify the types of data (all or portions thereof) which may be allocated for different tiered repositories. For example, the person may designate that any data related to a chronic health condition (e.g., diabetes, asthma, etc.) be stored in a higher performance tiered repository (e.g., providing access to more frequently used data). In the same instance, the person may designate that any data related to a specific time period, for example, within five years of the present date be stored in a lower performance tiered repository (e.g., less frequently access data).

To present the person with options, various graphical user interfaces may be generated which may include options for the classification criteria. The user may select any of these options to establish any number and type of criteria.

The request for designation of storage level performance may include a selection of minimum acceptable levels of performance for a tiered repository by the patient or individual operating patient device 100. The graphical user interfaces may be used similarly to present various operations and collect user input indicating selection of some of the presented operations.

The request for election for potential storage enhancement may request that a person specify if data (all or portions thereof) stored in data management system 106 may be available for use by different entities that may consume the data in exchange for an enhanced storage performance level for a tiered repository. The person may identify which types or portions of data that may be advertised to entities potentially interested in the data. For example, the person may specify any data (stored in data management system 106) related to diabetes may be presented to potential entities in exchange for an enhancement of storage performance level for a tiered repository in which the data related to diabetes is stored. The storage enhancement process may require an agreement between patient device 100 and data consumer 104 prior to the exchange of access to the data stored in data management system 106. Refer to FIG. 2C for additional information regarding storage enhancement process for advertised data.

While described as being part of the registration process, it will be appreciated that requests for such data may be dynamically presented as requests for data advertised by data management system 106 received.

Additionally, verification process 206 may be initiated by patient device 100. During verification process 206, any type of verifications (e.g., as specified in registration package) of patient device 100 may be performed. The verifications may attempt to verify the identity of the individual operating patient device 100. The verifications may be performed by providing a prompt to an individual operating patient device 100. Operator feedback may also be obtained by patient device during verification (e.g., the individual operating patient device may submit response(s) to the prompt). The operator feedback obtained during verification may be included in an approved data service package. The approved data service package may include the (i) operator feedback, (ii) responses to the request for designation of classification criteria, storage level performance, and/or election for potential storage enhancement for the data stored in data management system 106, (iii) and/or any other identifying information (e.g., identifier and/or metadata for patient device 100 included in registration data 204) which may be used to verify the identity of the individual operating patient device 100.

Once obtained by data management system 106, the approved data service package may be used to update the information regarding patient device 100 included in registration repository 210. For example, registration repository 210 may be updated to (i) associate operator feedback to the prompts with the identifier and/or metadata for patient device 100, and/or (ii) associate classification criteria, storage level performance, and election for potential storage enhancement with the identifier and/or metadata for patient device 100.

Once updated, the information in registration repository 210 may be usable to (i) associate information indicating the tiered repository to store portions of data for an person, and/or (ii) associate information indicating the criteria used for classification of the portions of data with the respective tiered repository.

Using the flow illustrated in FIG. 2A, any additional devices (e.g., data consumer 104, data source 108, and/or any additional devices) may be registered with data management system 106 to submit collection of data to store in data management system 106 and/or provide access to the data stored in data management system 106.

Turning to FIG. 2B, a second data flow diagram illustrating data flows, data processing, and/or other operations that may be performed by the system of FIG. 1 in accordance with an embodiment is shown. In FIG. 2B, example flows between data source 108 and data management system 106 are shown.

After registration of patient device 100 is complete, data management system 106 may perform data ingest process 216 through which data may be collected for storage in data management system 106 from data source 108. To initiate data ingest process 216, a data collection request may be provided to data source 108 from data management system 106 (in some cases, it will be appreciated that data source 108 may initiate data ingestion without being prompted by data management system 106). The data collection request may include a request for portions of data.

The data collection request may be based on diagnostic data request 214. Diagnostic data request 214 may be a request for diagnostic data from data source 108 and may be from a requesting entity. Diagnostic data request 214 may be generated via any process (e.g., based on user input, received from another device, etc.).

During data collection process 220, data as specified by the data collection request may be collected by computing resources operated by data source 108 such as hardware components (not shown in FIG. 2B) and/or any devices operated by data source 108.

The data (e.g., healthcare information), the identifier or metadata through which data source 108 may be identified (e.g., obtained from registration data 204), and/or other information may be added to a collected data package. The collected data package may be provided to data management system 106.

Data ingest process 216 may receive and analyze the collected data package using registration data (e.g., associated between the identifier/metadata/the user) from registration repository 210. Data ingest process 216 may (i) verify that the collected data package is from a registered device, (ii) identify the person (e.g., patient) to which the collected data is to be associated, and/or (iii) add the collected data in unranked data queue 218 (e.g., including the association of the person regarding the collected data). Unranked data queue 218 may be implemented using, for example, an in memory data structure such as a first in first out queue.

As will be discussed with respect to FIG. 2C, data management system 106 may perform a classification process of the collected data to identify the associated tier classified repository in which to store the data. Each tier classified repository may perform respective workflows (e.g., different data minimization techniques) for storing the collected data in a respective tier classified repository. As previously described in FIG. 2A, data management system 106 may establish storage performance for each tier classified repository based on the selection of minimum acceptable level of performance obtained from the person (e.g., via patient device 100) for which data management system 106 is providing storage services.

Turning to FIG. 2C, a third data flow diagram illustrating data flows, data processing, and/or other operations that may be performed by the system of FIG. 1 in accordance with an embodiment is shown.

Continuing with the discussion from FIG. 2B, once collected data is obtained, the collected data may be classified with respect to different types of tiered repositories (e.g., different storage performance levels). To do so, portions of the collected data may be added to unranked data queue 218 (as previously described in FIG. 2B). The unranked data queue 218 may be implemented as, for example, first in first out queue.

Once added to unranked data queue 218, a portion of data 222 from unranked data queue 218 may be subject to tier classification process 228 based on classification criteria 224 (which may correspond to a type of the portion of data, or other characteristic of the portion), and/or any enhanced classification criteria 226 (e.g., which may also correspond based on characteristics of the portion).

Tier classification process 228 may classify portion of data 222 based on the corresponding classification criteria and allocate the classified portion of data for storage in one of tier classified repositories (230A-230N) based on the classification of each portion of data identified by the process. To do so, tier classification process 228 may ingest portion of data 222 from unranked data queue 218 and classification criteria 224 from registration repository 210.

Classification criteria 224 may be used to perform lookups (or other processes) to identify tier classified repositories (e.g., tier classified repository 230A-230N) for storage of the corresponding portion(s) of data (e.g., portion of data 222). Classification criteria 224 may be obtained from registration repository 210 (e.g., based on the identifier/metadata associated with the person for which data is being stored). As previously described in FIG. 2A, classification criteria 224 may be defined or provided (e.g., during registration process) by the person for which data management system 106 is providing data storage services.

Based on portion of data 222 and classification criteria 224, tier classification process 228 may identify the respective tier classified repository 230 (e.g., at least one of tier classified repository 230A-230N). Once identified, data management system 106 may store portion of data 222 in the respective tier classified repository (e.g., tier classified repository 230A-230N).

In some instances, tier classification process 228 may identify multiple classification criteria (e.g., classification criteria 224 and enhanced classification criteria 226) which may all be applicable to a portion of data. These different criteria may indicate different resolutions to the question of which tier classified repository to store the portion of the data in for storage.

The disagreement may be resolved via a resolution process. The resolution process may be (i) apply whichever criteria would place the portion of data in a highest performing tier classified repository, (ii) average an outcome of the criteria (e.g., if a first criteria would place a portion of data in a highest performing tier classified repository, and a second criteria would place the portion in a low performing tier classified repository, then the disagreement may be resolved by placing the portion in a moderate performance tier classified repository), (iii) allowing a person to decide which criteria to apply (e.g., a message may be sent to a patient device, and a user of the patient device may provide user input indicate which of the tier classified repositories in which to store the portion of the data, (iv) using a lowest performance tier classified repository indicated by the different criteria, (v) use the criteria that is most highly aligned with the portion of the data (e.g., different classification criteria may apply to broader or narrower classes of data, the criteria that applies to the narrowest range of data may be used to decide where to store the portion of the data), and/or other resolution processes and/or combinations of resolution processes.

For example, tier classification process 228 may include receiving enhanced classification criteria 226 in addition to receiving portion of data 222 and classification criteria 224. Enhanced classification criteria 226 may include an agreed enhanced standard for the minimum acceptable level of performance for a certain type of data (e.g., in exchange for granting access to a portion of the person's data to a third party or entity such as data consumer 104). Enhanced classification criteria 226 may be obtained from conditional enhancement repository 212.

Tier classification process 228 may discriminate between multiple different classification criteria. For instance, tier classification process 228 may receive classification criteria 224 and enhanced classification criteria 226 based on portion of data 222. The multiple classification criteria (e.g., classification criteria 224 and enhanced classification criteria 226) may provide conflicting information regarding which of the tier classified repositories in which to store portion of data 222. Tier classification process 228 may resolve any differences (e.g., conflicting criteria for a portion of data) between the multiple classification criteria by obtaining a resolved classification criteria, as discussed above. The resolved classification criteria may represent one of the multiple criteria associated with the portion of data (e.g., portion of data 222), or combination of criteria with a resolved outcome of applying all of the criteria (e.g., averaging where to store the portion of data 222). Tier classification process 228 may obtain the resolved classification criteria by selecting, for example, the criteria associated with a higher performing tier classified repository. For example, enhanced classification criteria 226 may indicate portion of data 222 to be stored in tier classified repository 230A and classification criteria 224 may indicate portion of data 222 to be stored in tier classified repository 230N. In this example, tier classification process 228 may select the higher performance repository.

By storing the portions of data in this manner, the usability of the portion of data may be improved while limiting cost for storing the portion of data for subsequent use. For example, if access to the portion of data is required in the future, the portions of data corresponding to the portion of data most likely to be displayed may be stored in higher performance storage thereby facilitate rapid reading of the portions of data into memory to facilitate display of this portion of the data for subsequent use. In contrast, the portion of data corresponding to the data that is unlikely to be displayed may be stored in lower performance but cost effective storage to reduce aggregate cost for storing portion of data 222 for subsequent use.

Once stored in the respective tier classified repository, portion of data 222 and/or other data stored in the repositories may be further used by data management system 106 in data reduction process 240. During data reduction process 240, advertised data 242 may be obtained based on the content (all or a portion) of the tier classified repositories. Advertised data 242 may include snippets or other reduced forms of the content of the repositories, and may be distributed to data consumers such that the consumers may be information of data available from data management system 106.

Returning to the discussion of the tier classified repositories, the storage resources allocated to the different tier classified repositories may vary thereby establishing a range of different performance and cost points for storage of data. Additionally, any of the tier classified repositories may be supplemented with storage resources from other system (e.g., such as public/private clouds) operated by other entities. When a user of data management system 106 agrees to allow selective access to some data in the repositories, the data consumers may allocate resources of these other systems to the tier classified repositories, and/or establish new tier classified repositories. Corresponding enhanced classification criteria 226 may also be generated based on, for example, limits on the use of these supplemented storage resources imposed by the data consumers, and/or restrictions placed on use of the supplemental storage resources by patient (e.g., a patient may elect to limit use of such resources because the resources may only be available for a limited duration of time, such as while limited access to data continues to be granted).

Further, any of the tier classified repositories may implement one or more data minimization techniques. The data minimization techniques may include deduplication, compression, etc.

Additionally, any of the tier classified repositories may implement one or more data resiliency techniques. The data resiliency techniques may include duplication, adding parity information to resolve bit-wise errors, etc.

Different combinations of data minimization and resiliency techniques may be applied to different tier classified repositories. These techniques may have different implications regarding the performance, resiliency, efficiency, etc. of the respective tier classified repository. Consequently, classification criteria 224, 226 established to guide storage of different portions of data may have significant impacts on the use of limited resources, performance, etc.

Turning to FIG. 2D, a diagram of tier classified repositories 230A-230N of data management system 106 in accordance with an embodiment is shown. As noted above tier classified repositories may store a portion of data (and/or other portions of data) that has been classified for corresponding storage performance levels. Tier classified repository 230A illustrated in FIG. 2D may represent one or more tier classified repositories (e.g., tier classified repository 230A-230N) of a data management system.

Each tier classified repository (e.g., 230A-230N) may store any quantity of data, may include storage identifiers 234 usable to identify the repository, and may include access information 236 for access the tier classified repository.

Turning to FIG. 2E, a data flow diagram illustrating data flows, data processing, and/or other operations that may be performed by the system of FIG. 1 in accordance with an embodiment is shown. In FIG. 2E, example flows between verified patient device 100, data management system 106, and data consumer 104 are shown.

As previously described above, data management system 106 may provide limited access of advertised data 242 to potentially interested data consumers (e.g., data consumer 104) in order to facilitate a potential request for access to portions of data in exchange for enhancement of storage performance.

Based on the advertised data, data consumer 104 may send a data request for some data stored in data management system as part of data request process 250. The data request may be provided to data management system 106. The data request may include a request for portions of data (e.g., associated with advertised data 242 accessible by a data consumer) stored in a tier classified repository in data management system 106. In addition, the data request may include registration data 204 associated with data consumer 104 thereby identifying the individual and/or entity providing the data request.

Once received by data management system 106, the data request may initiate data identification process 252. Data identification process 252 may include (i) identifying, based on the data request, at least one portion of data stored in data management system 106 that is usable in part by data consumer 104 in exchange for enhancement of storage performance level, (ii) identifying, based on the at least one portion of data, the associated tier classified repository, and/or any other identification of data responsive to the data request. During data identification process 252, the person associated with the portion of data as specified by data request may be identified using registration repository 210.

To facilitate control over storage performance for portions of data stored in data management system 106 on behalf of a person, an access request may be generated and sent to patient device 100 to verify that access to the portion of data requested is to be granted in exchange for enhancement of storage performance for the respective tier classified repository (e.g., tier classified repository 230A-230N). For example, data management system 106 may identify patient device 100 (e.g., identifier and/or metadata for patient device 100) from registration repository 210 and may provide an access request to patient device 100. The access request may include (or indicate) identified portions of data responsive to data request as identified by data management system 106, identity of tier classified repository in which the portions of data responsive to data request is located, and/or information regarding the identity of data consumer 104 (e.g., identifier and/or metadata for data consumer 104 from registration repository 210).

When the access request is obtained by patient device 100, access management process 254 may analyze the request to determine whether to provide access to identified data responsive to the request in exchange for enhancement of storage performance associated with the tier classified repository in which the data (e.g., portions of data responsive to the data request) may be stored. The determination may be made by the person or patient operating patient device 100 via patient input 256. For example, a graphical user interface may be presented to the user of patient device 100 to display information about the requested data, current storage performance level of the tier classified repository, the requestor, and to allow the user to provide user input indicating how to respond to the request (e.g., agree or disagree, all or in part). Patient input 256 may include the patient or person's response to the access request. For instance, the patient may agree or limit which portions of identified data responsive to the data request are to be accessed by data consumer 104 in exchange for enhancement of the storage performance level established for the respective tier classified repository. The resulting portions of identified data responsive to the data request may be indicated, identified, etc. in the access information provided to data management system 106.

The access information may specify whether the data consumer 104 is to be provided with access to, and the extent of the access (e.g., access may only be granted for a portion of requested data), the data responsive to the request and/or specify the agreeable enhanced storage performance level for a tier classified repository for the selected portions of the data responsive to the request. If the access to the selected data is authorized by patient device 100, then the selected data may be provided to data consumer 104 in exchange for the agreed enhancement of storage performance level. Otherwise, access to the selected data may be denied.

When the access information is obtained by data management system 106, an approved data package may be generated and provided to data consumer 104. The approved data package may include the data responsive to the request, portions of the data responsive to the request as permitted by patient device 100, agreed enhanced storage performance level for the associated tier classified repository, and/or access to any other information as granted by patient device 100. Data consumer 104 may ingest the approved data package and store the selected data and/or information contained therein for use by data consumer 104.

As discussed above, the components of FIG. 1 may perform various methods to manage storage space use in a data management system. FIGS. 3A-3B illustrate methods that may be performed by the components of FIG. 1. In the diagrams discussed below and shown in FIGS. 3A-3B, any of the operations may be repeated, performed in different orders, and/or performed in parallel with or in a partially overlapping in time manner with other operations.

Turning to FIG. 3A, a flow diagram illustrating a method of managing storage space use in a data management system in accordance with an embodiment is shown. The method may be performed, for example, by any of patient device 100, data consumer 104, data management system 106, data source 108, and/or other components of the system shown in FIGS. 1-2E.

Prior to operation 300, a data processing system may obtain sensitive data for an individual and store the sensitive data in a data repository within the data processing system. The sensitive data may have been obtained through various processes such as generation, acquisition from external entity (e.g., medical provider), acquisition from the individual whose sensitive data is being stored, and/or by any other method. The sensitive data may include data relating to healthcare information for an individual (e.g., medical records). The sensitive data may be categorized and processed by the data processing system based on potential conditions (e.g., health conditions such as asthma, diabetes, etc.). The data processing system may collect the sensitive data via the method illustrated in FIG. 2B. Refer to FIG. 2B for additional details regarding the method of collecting data (e.g., all or a portion of) managed by the data processing system.

At operation 300, a data package from a data source may be obtained. The data package may comprise data relevant to a person for which the data management system provides data storage services. The data package may be obtained by (i) receiving a request for the data package from another device (e.g., data consumer 104), (ii) generating a request (e.g., the data management system may generate the request), and/or via other methods. If the data package is obtained through generating a request by the data management system, the request may be sent to the data source through which the data package will be obtained.

The data package may be generated by a data source. The data source may generate the data package using data collection process 220, as discussed with respect to FIG. 2B.

At operation 301, a portion of data from the data package may be obtained. The portion of data may not be classified for storage in tier classified repositories managed by the data management system. The portion of data may be obtained by (i) identifying procedures for processing portions of the data based on classification criteria (e.g., established by the person during registration) and/or enhanced classification criteria (e.g., established by agreement by the person and a data consumer).

At operation 302, a tier classification process 240 using the portion of data and at least one classification criteria to select a tier classified repository of the tier classified repositories may be performed. The at least one classification criteria being defined by the person.

Tier classification process 228 may be performed by (i) discriminating a first classification criteria from first multiple classification criteria based on the portion of the data, (ii) discriminating a second classification criteria from second multiple classification criteria based on the portion of the data, (iii) resolving a difference between the first classification criteria and the second classification criteria to obtain a resolved classification criteria, (iv) identifying one of the tier classified repositories for the portion of the data based on the resolved classification criteria, and/or any other methods.

For example, data management system 106 may identify multiple classification criteria with conflicting storage performance levels related to a single portion of data. Data management system 106 may perform a resolution conflict process such as identifying which classification criteria allows the data to be stored in a tier classified repository with a higher performing storage. In some instances, data management system 106 may resolve any difference between the first classification criteria and the second classification criteria by obtaining an average of first classification criteria and the second classification criteria. For example, if the first classification criteria associates the portion of data with a high performance repository and the second classification criteria associates the portion of data with a low performance repository, data management system may select an average of the two (e.g., a medium performance repository) in which to store the portion of data.

At operation 303, the portion of the data may be stored in the tier classified repository. The portion of the data may be stored by providing the portion of the data to the respective repository and/or instructions to store the portion of the data in the corresponding repositories. The portion of the data provided to the repository may be performed in a manner specified by the respective repository in which the portion of data is to be stored. For example, the tier classified repositories for the portions of data that are associated with lower performance storage (as determined by the person via the classification criteria) may be stored in a reduced size state.

The method may end following operation 303.

Turning to FIG. 3B, a flow diagram illustrating a method of establishing storage performance enhancement in accordance with an embodiment is shown. The method may be performed by any of patient device 100, data consumer 104, data management system 106, and/or other components of the system shown in FIG. 1.

Prior to operation 304, a data management system or another device may determine that portions of data stored in one of the tier classified repositories for the patient may be desired for potential use by a data consumer. Data management system or another device may facilitate limited access to the portion of data stored in a tier classified repository for a potential data consumer or entity. The portion of data stored in a tier classified repository may be advertised to a potential data consumer or entity.

At operation 304, a data reduction process using at least the portion of data from at least one of the tier classified repositories may be performed to obtain advertised data. The advertised data being accessible by a data consumer. The data reduction process may be performed by (i) sampling data from the tier classified repositories, (ii) generating synthetic data based on data from the tier classified repositories (e.g., the synthetic data be similar to but different from actual data), (iii) generating summaries of the data stored in the tier classified repositories, (iv) generating responses to questionnaires or other inquiries received from previously serviced data consumers, and/or via other processes. The result of the data reduction process may be the advertised data which may inform data consumers of the content of data stored in a data management system without revealing person information, or divulging the content (or sufficient content thereby rendering the data of reduced value to the data consumers).

At operation 305, a request for access to the portion of data based on the advertised data is obtained. The request may be obtained by receiving it from a data consumer via a message. The request may specify some stored data and may present an enhancement that will be provided should the request be accepted.

At operation 306, authorization to disclose the portion of data associated with the advertised data may be requested. The request being made to a patient device.

At operation 307, a response indicating whether authorization is granted by the patient device may be obtained. The response may be obtained by receiving it in a message from the patient device. The response may indicate whether the request is granted, and may include enhanced classification criteria. The enhanced classification criteria may be defined by the operation of the patient device (e.g., in cooperation with the data consumer, which may limit use of supplemental storage resources).

At operation 308, a determination is made regarding whether the authorization to disclose the portion of data associated with the advertised data is granted. The determination may be made based on the response, which may indicate authorization or rejection of disclosure of the portion of the data. If the authorization to disclose the portion of data is granted (e.g., the determination is "Yes" at operation 308), then the method may proceed to operation 309. Otherwise, the method may proceed to operation 310.

At operation 309, the portion of data to service the request may be provided to the data consumer. The portion of data to service the request may be provided by (i) sending the portion of data to the requesting individual or entity via communication by a data processing system, (ii) generating an access code for the requesting individual or entity in order to access the portion of data via portal (e.g., a website), (iii) and/or any other methods. The method may end following operation 309.

Returning to operation 308, if the authorization to disclose the portion of data associated with the advertised data is not granted (e.g., the determination is "No" at operation 308), then the method may proceed to operation 310. At operation 310, access to the portion of data to service the request may be denied. The method may end following operation 310.

Figure 4:
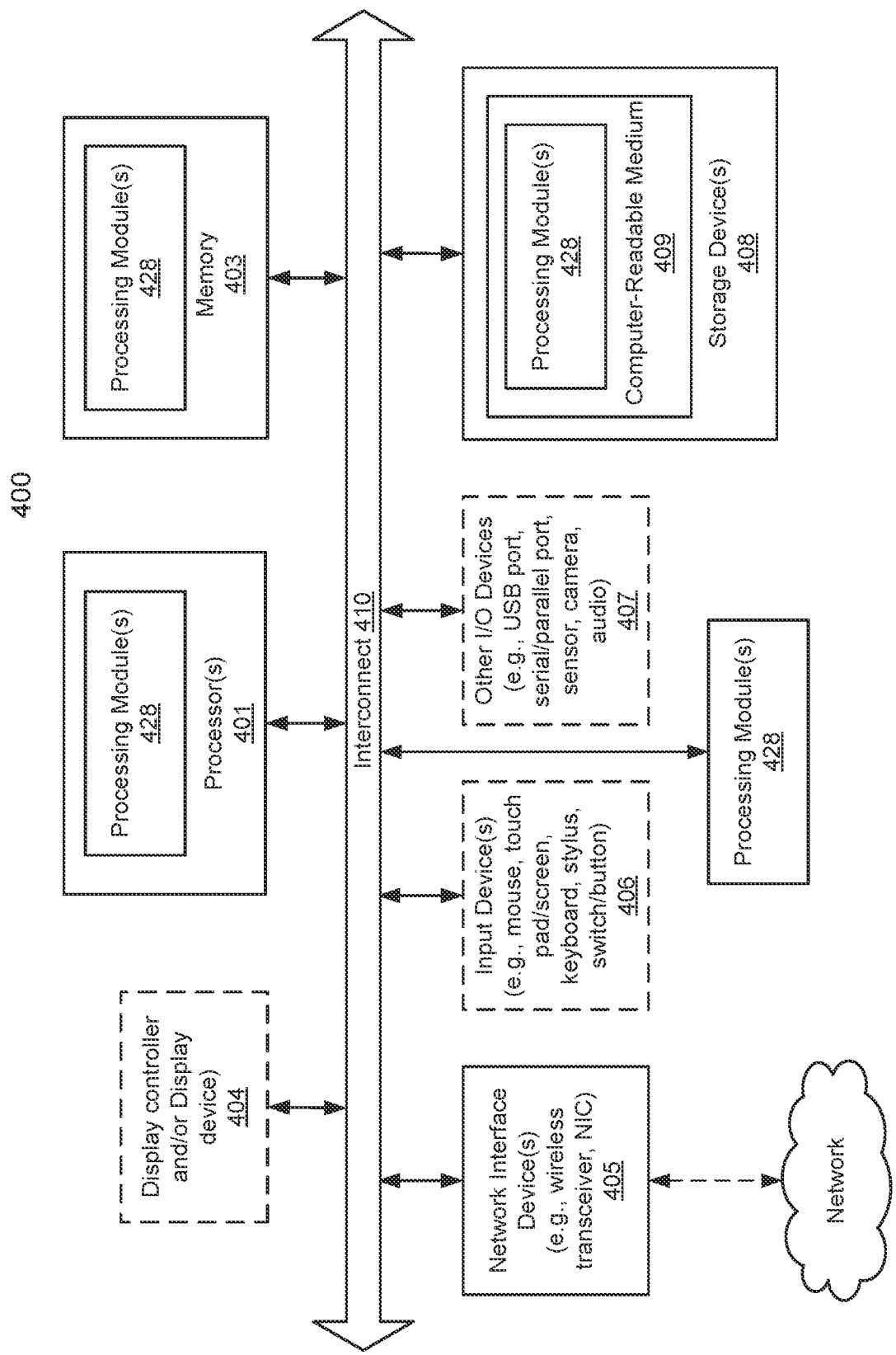
FIG. 4 shows a block diagram illustrating a data processing system in accordance with an embodiment.

Using the methods illustrated in FIGS. 3A-3B, embodiments disclosed herein may facilitate storage allocation for portions of data held on behalf of a person. The storage allocation may Any of the components illustrated in FIGS. 1-2E may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428)

embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing storage space use in a data management system, the method comprising:

obtaining a data package from a data source, the data package comprising data relevant to a person for which the data management system provides data storage services;

storing the data package in an unranked data queue of the data management system, the unranked data queue being a first in first out queue;

obtaining a portion of data from the unranked data queue, the portion of data obtained from the unranked data queue is not yet classified for storage in tier classified repositories managed by the data management system and comprises metadata that identifies the person;

obtaining, using the metadata from the portion of the data, at least one classification criteria from a registration repository of the data management system, the at least one classification criteria being obtained from the person and stored into the registration repository in association with the person prior to the data package being obtained from the data source;

performing a tier classification process using the portion of the data and the at least one classification criteria to select a tier classified repository of the tier classified repositories;

storing the portion of the data in the tier classified repository;

performing a data reduction process on the portion of data stored into the tiered classified repository to generate an advertised data for the portion of the data, the advertised data being a reduced form of the portion of data made up of one or more snippets of the portion of the data without revealing an entirety of the portion of data;

distributing only the advertised data to a data consumer in place of the portion of the data;

obtaining, in response to the distributing, a request for access to the portion of data based on the advertised data that was advertised, the request being received from the data consumer;

requesting authorization to disclose the entirety of the portion of data used as a basis to generate the advertised data, the request being made to a patient device;

obtaining a response indicating whether authorization is granted by the patient device; and in a first instance of the response where the authorization to disclose the portion of data is granted by the patient device, providing the entirety of the portion of data to the data consumer to service the request.

2. The method of claim 1, wherein each of the tier classified repositories perform respective workflows for storing data in the respective tier classified repository, each of the respective workflows comprising a subset of a set of data minimization techniques, the data minimization techniques placing stored data in a reduced size state and requiring different quantities of computing resources to reconstitute the stored data using the reduced size state data.

3. The method of claim 2, wherein the data minimization techniques comprise deduplication and compression.

4. The method of claim 2, wherein the storage performance level of each of the tier classified repositories is indicated to the person as a level of performance that the respective tier classified repository will exhibit for storage of the person's data.

5. The method of claim 4, further comprising:
for a first tier classified repository of the tier classified repositories:
establishing a storage performance level for the first tier classified repository by:
obtaining, from the person and during a registration of the person with the data management system for the data management system to provide the data storage services to the person, a selection indicating a minimum acceptable level of performance of the first tiered classified repository; and
configuring, by the data management system, the storage performance level of the first tiered classified repository to match the minimum acceptable level of performance specified by the person.

6. The method of claim 5, wherein the portion of the data is stored in the first tier classified repository based on the at least one classification criteria and establishing the storage performance level of the first tier classified repository further comprises:
after the storage performance level of the first tiered classified repository is configured to match the minimum acceptable level of performance specified by the person and the portion of the data is stored into the first tier classified repository having the storage performance level of the minimum acceptable level of performance based on the at least one classification criteria:
obtaining, from the person, a second selection indicating an agreed to enhancement for the minimum acceptable level of performance for the first tier classified repository, the agreed to enhancement also granting access to at least the portion of data stored in the first tier classified repository to a data consumer that is a party to the agreed to enhancement;
obtaining an enhanced minimum acceptable level of performance based on the agreed to enhancement to the minimum acceptable level of performance;
supplementing, by the data management system, the first tiered classified repository with storage resources to increase the minimum acceptable level of performance to the enhanced minimum acceptable level of performance; and
maintaining storage of the portion of the data in the first tiered classified repository supplemented to perform at the enhanced minimum acceptable level of performance regardless of whether a storage performance level specified in the at least one classification criteria used during the tier classification process of the portion of the data conflicts with the enhanced minimum acceptable level of performance.

7. The method of claim 1, wherein performing the tier classification process comprises:
determining that the portion of the data is associated with a first classification criteria and a second classification criteria, the first classification criteria and the second classification criteria specifying conflicting storage performance levels;
resolving the conflicting storage performance levels of the first classification criteria and the second classification criteria to obtain a resolved classification criteria with a resolved storage performance level that is different from both of the conflicting storage performance levels of the first classification criteria and the second classification criteria; and
identifying one of the tier classified repositories for the portion of the data based on the resolved storage performance level of the resolved classification criteria.

8. The method of claim 7, wherein the first classification criteria and the second classification criteria are established by the person during a registration process, and resolving the conflicting storage performance levels of the first classification criteria and the second classification criteria comprises obtaining an average of the conflicting storage performance levels of the first classification criteria and the second classification criteria as the resolved storage performance.

9. The method of claim 1, further comprising:
granting access of the portion of the data in the tier classified repository to computing device associated with the data consumer different from the person, the computing device being separate and distinct from the data management system; and
after the access is granted, allocating storage space of the computing device associated with the data consumer to the tier classified repository to supplement the portion of the finite amount of storage space already allocated to the tier classified repository.

10. A non-transitory machine-readable medium having instructions stored therein, which when executed by a processor, cause the processor to perform operations for managing storage space use in a data management system, the operations comprising:
obtaining a data package from a data source, the data package comprising data relevant to a person for which the data management system provides data storage services;
storing the data package in an unranked data queue of the data management system, the unranked data queue being a first in first out queue;

obtaining a portion of data from the unranked data queue, the portion of data obtained from the unranked data queue is not yet classified for storage in tier classified repositories managed by the data management system and comprises metadata that identifies the person;

obtaining, using the metadata from the portion of the data, at least one classification criteria from a registration repository of the data management system, the at least one classification criteria being obtained from the person and stored into the registration repository in association with the person prior to the data package being obtained from the data source;

performing a tier classification process using the portion of the data and the at least one classification criteria to select a tier classified repository of the tier classified repositories;

storing the portion of the data in the tier classified repository;

performing a data reduction process on the portion of data stored into the tiered classified repository to generate an advertised data for the portion of the data, the advertised data being a reduced form of the portion of data made up of one or more snippets of the portion of the data without revealing an entirety of the portion of data;

distributing only the advertised data to a data consumer in place of the portion of the data;

obtaining, in response to the distributing, a request for access to the portion of data based on the advertised data that was advertised, the request being received from the data consumer;

requesting authorization to disclose the entirety of the portion of data used as a basis to generate the advertised data, the request being made to a patient device;

obtaining a response indicating whether authorization is granted by the patient device; and in a first instance of the response where the authorization to disclose the portion of data is granted by the patient device, providing the entirety of the portion of data to the data consumer to service the request.

11. The non-transitory machine-readable medium of claim 10, wherein each of the tier classified repositories perform respective workflows for storing data in the respective tier classified repository, each of the respective workflows comprising a subset of a set of data minimization techniques, the data minimization techniques placing stored data in a reduced size state and requiring different quantities of computing resources to reconstitute the stored data using the reduced size state data.

12. The non-transitory machine-readable medium of claim 11, wherein each of the tier classified repositories comprise an amount of limited storage resources allocated to the respective tier classified repository, the amount being based on a storage performance level for the respective tier classified repository, the storage performance level being indicated to the person as a level of performance that the respective tier classified repository will exhibit for storage of the person's data.

13. The non-transitory machine-readable medium of claim 12, wherein the operations further comprise:
for a tier classified repository of the tier classified repositories:
establishing storage performance for the tier classified repository, the establishing the storage performance comprising:
during a registration of the person for the data management system:
obtaining, from the person, a selection indicating minimum acceptable level of performance for the tier classified repository.

14. The non-transitory machine-readable medium of claim 13, wherein establishing the storage performance further comprising:
after the registration of the person for the data management system:
obtaining, from the person, a second selection indicating an agreed to enhancement for the minimum acceptable level of performance for the tier classified repository, the agreed to enhancement also granting access to at least a portion of the person's data stored in the data management system to a data consumer that is a party to the agreed to enhancement.

15. The non-transitory machine-readable medium of claim 14, wherein establishing the storage performance further comprising:
obtaining an enhanced minimum acceptable level of performance using the selection and the second selection to obtain the storage performance.

16. A data processing system, comprising:
a processor; and
a memory coupled to the processor to store instructions, which when executed by the processor, cause the processor to perform operations for managing storage space use in a data management system, the operations comprising:
obtaining a data package from a data source, the data package comprising data relevant to a person for which the data management system provides data storage services;
storing the data package in an unranked data queue of the data management system, the unranked data queue being a first in first out queue;
obtaining a portion of data from the unranked data queue, the portion of data obtained from the unranked data queue is not yet classified for storage in tier classified repositories managed by the data management system and comprises metadata that identifies the person;
obtaining, using the metadata from the portion of the data, at least one classification criteria from a registration repository of the data management system, the at least one classification criteria being obtained from the person and stored into the registration repository in association with the person prior to the data package being obtained from the data source;
performing a tier classification process using the portion of the data and the at least one classification criteria to select a tier classified repository of the tier classified repositories;
storing the portion of the data in the tier classified repository;
performing a data reduction process on the portion of data stored into the tiered classified repository to generate an advertised data for the portion of the data, the advertised data being a reduced form of the portion of data made up of one or more snippets of the portion of the data without revealing an entirety of the portion of data;
distributing only the advertised data to a data consumer in place of the portion of the data;
obtaining, in response to the distributing, a request for access to the portion of data based on the advertised data that was advertised, the request being received from the data consumer;

requesting authorization to disclose the entirety of the portion of data used as a basis to generate the advertised data, the request being made to a patient device;

obtaining a response indicating whether authorization is granted by the patient device; and in a first instance of the response where the authorization to disclose the portion of data is granted by the patient device, providing the entirety of the portion of data to the data consumer to service the request.

17. The data processing system of claim 16, wherein each of the tier classified repositories perform respective workflows for storing data in the respective tier classified repository, each of the respective workflows comprising a subset of a set of data minimization techniques, the data minimization techniques placing stored data in a reduced size state and requiring different quantities of computing resources to reconstitute the stored data using the reduced size state data.

18. The data processing system of claim 17, wherein each of the tier classified repositories comprise an amount of limited storage resources allocated to the respective tier classified repository, the amount being based on a storage performance level for the respective tier classified repository, the storage performance level being indicated to the person as a level of performance that the respective tier classified repository will exhibit for storage of the person's data.

19. The data processing system of claim 18, wherein the operations further comprise:

for a tier classified repository of the tier classified repositories:

establishing storage performance for the tier classified repository, the establishing the storage performance comprising:

during a registration of the person for the data management system:

obtaining, from the person, a selection indicating minimum acceptable level of performance for the tier classified repository.

20. The data processing system of claim 17, wherein the data minimization techniques comprise deduplication and compression.

* * * * *